(12) United States Patent
Satoh et al.

(10) Patent No.: US 8,386,998 B2
(45) Date of Patent: *Feb. 26, 2013

(54) SOFTWARE DEVELOPMENT APPARATUS FOR MODEL THAT REQUIRES SECURITY

(75) Inventors: Fumiko Satoh, Tokyo (JP); Yuichi Nakamura, Kanagawa-ken (JP); Kouichi Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1338 days.

This patent is subject to a terminal disclaimer.

(21) Appl. No.: 12/061,723

(22) Filed: Apr. 3, 2008

(65) Prior Publication Data

US 2008/0189676 A1    Aug. 7, 2008

Related U.S. Application Data

(63) Continuation of application No. 11/565,265, filed on Nov. 30, 2006, now Pat. No. 8,095,918.

(30) Foreign Application Priority Data

Dec. 27, 2005  (JP) ................................. 2005-374991

(51) Int. Cl.
G06F 9/45    (2006.01)
(52) U.S. Cl. ...................................................... 717/104
(58) Field of Classification Search .................. 717/104
See application file for complete search history.

(56) References Cited

U.S. PATENT DOCUMENTS

| | | | | |
|---|---|---|---|---|
| 7,685,511 | B2 * | 3/2010 | Mysore | 715/234 |
| 2002/0092004 | A1 * | 7/2002 | Lee et al. | 717/140 |
| 2011/0131548 | A1 * | 6/2011 | Colton et al. | 717/106 |
| 2012/0084665 | A1 * | 4/2012 | Bookstaff | 715/748 |

OTHER PUBLICATIONS

U.S. Appl. No. 11/565,265, Notice of Allowance, Mailed Sep. 1, 2011, 8 pages.
Craig Larman, "Applying UML and Patterns", An Introduction to Object-Oriented Analysis and Design and Iterative Development, Third Edition, pp. 1-2.

* cited by examiner

Primary Examiner — John Chavis
(74) Attorney, Agent, or Firm — Gibb & Riley, LLC

(57) ABSTRACT

A software development apparatus for developing application software based on an object model that requires security in a web service application is provided. The software development apparatus includes a display unit that displays, in a class diagram of the application software, security annotation for adding security requirements for a service, input means for inputting the security annotation, transforming means for transforming the class diagram into a configuration model based on a markup language, and configuration-file creating means for creating a configuration file based on a markup language by serializing the configuration model based on a markup language. The security annotation includes the security requirements and a token class of a security token that is a certificate for declaring identity of a client to a server.

15 Claims, 8 Drawing Sheets

FIG. 6
COMPARISON OF CONFIGURATION MODELS
- TRANSFORMATION IN CASE WHERE TOKEN IS SHARED BY MORE THAN ONE SECURITY REQUIREMENT
• DD/Binding Model: PROCESS IS COMPLICATED BECAUSE DESCRIPTION OF TOKEN IS SPREAD ACROSS BOTH MODELS
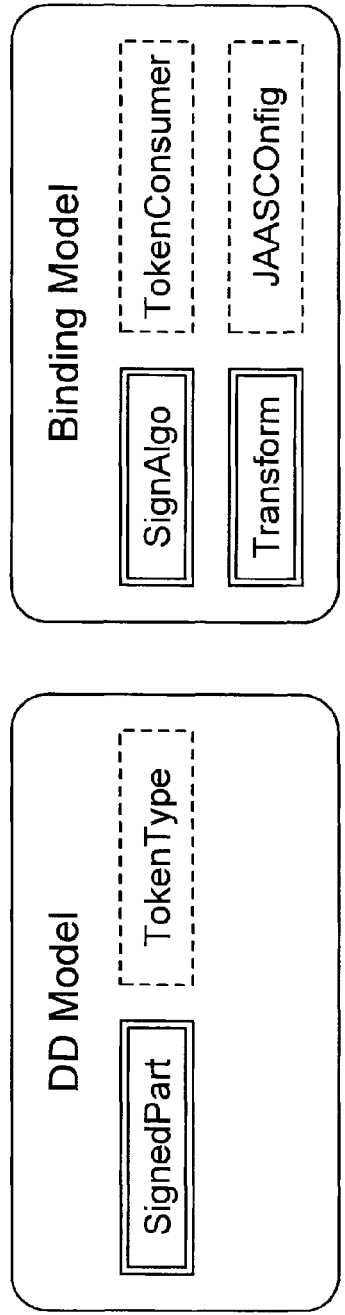
• Integrity/Token Model: ONLY TOKEN MODEL NEEDS TO BE PROCESSED
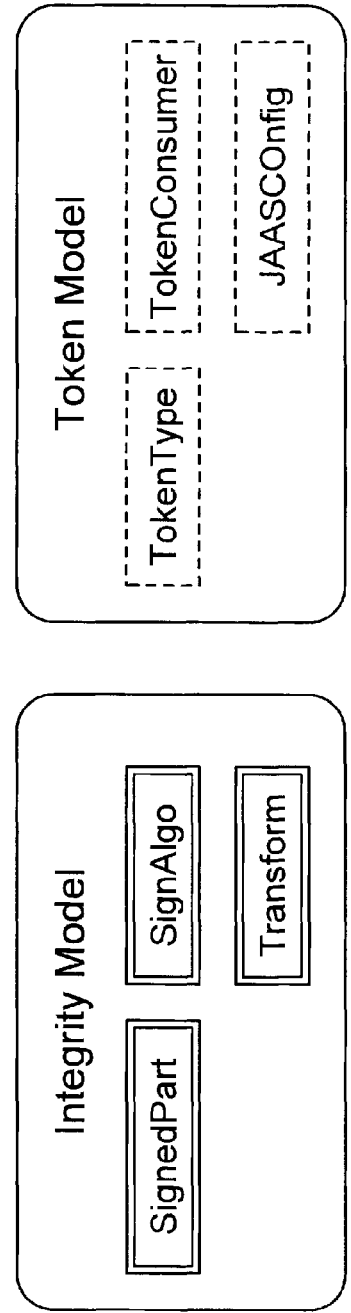

FIG. 7

STRUCTURES OF INDIVIDUAL MODELS
- DATA STRUCTURES CORRESPONDING TO INDIVIDUAL ITEMS OF SECURITY ANNOTATION
  - *SECURITY ANNOTATION AND DATA OF SIM ARE RETAINED*

- INTEGRITY MODEL
  - *Signed part: SOAP Body*
  - SignatureMethod Algorithm
  - C14N Algorithm
  - DigestMethod Algorithm
  - Transform Algorithm

- CONFIDENTIALITY MODEL
  - *Encrypted part: SOAP Body*
  - DataEncryption Method Algorithm
  - KeyEncryption Method Algorithm

- AUTHENTICATION MODEL
  - *Caller type: BasicAuth*

- TOKEN MODEL
  - *Token type: X509Token*
  - TokenConsumer class
  - JAAS config name

SOFTWARE DEVELOPMENT APPARATUS FOR MODEL THAT REQUIRES SECURITY

CROSS-REFERENCE TO RELATED APPLICATIONS

This application is a Continuation of U.S. application Ser. No. 11/565,265 filed Nov. 30, 2006, now U.S. Pat. No. 8,095,918, Issued Jan. 10, 2012,thecomplete disclosure of which, in its entirety, is herein incorporated by reference.

BACKGROUND OF THE INVENTION

1. Field of the Invention

The present invention relates to software development apparatuses for models that require security, and in more detail, relates to a software development apparatus, a software development program, and a software development method for models that require security in web service applications.

2. Background Art

As the Internet has become widespread, the number of systems in which electronic commerce and the like are conducted using the web has increased. These systems contain data, such as personal data, passwords, and data related to money, for which security must be assured.

In WebSphere Application Server (WAS), WAS-Security (Web Services Security) is available to services in which electronic commerce and the like are conducted using the web. In WS-Security, in order to protect SOAP messages that are exchanged in web services, for example, methods for adding signatures to the messages, ciphering the messages, and adding data for authentication to the messages are defined. WS-Security is presented in Non-Patent Document 1.

In many cases, the Unified Modeling Language (UML) is used to develop these systems. The UML is presented in Non-Patent Document 2.

[Non-Patent Document 1] Kenji Katoh and four associates, "Web Services Security", May 23, 2002, Microsoft home page, searched on Oct. 28, 2005, <URL: http://www.microsoft.com/japan/msdn/webservices/spec/ws-security.asp>.

[Non-Patent Document 2] Technologic Arts Incorporated, "UML modeling L1", SHOEISHA Co., Ltd., pp. 46-63, pp. 224-228.

SUMMARY OF THE INVENTION

Determining security requirements required for a web service application system requires knowledge about the details of the application. Thus, it is appropriate that an application developer determines security requirements.

On the other hand, configuring web service security settings that satisfy the determined security requirements requires technical knowledge about web service security. Thus, it is appropriate that a security developer configures web service security settings.

For example, an editor for WS-Security configuration is provided in Rational Application Developer 6.0 as a method for configuring the settings. However, even when an operator has knowledge about the operation of runtime, it is very cumbersome to correctly configure the settings because the number of setting items is large.

Accordingly, in the present invention, in order to resolve the forgoing problems, it is required that an application developer and a security developer jointly, not separately, configure web service security settings. That is to say, it is an object of the present invention to provide a software development apparatus, a computer program for software development, and a software development method, in which an application developer, who has knowledge about the details of an application, defines security requirements required for the application, and a security developer creates a configuration model based on a markup language on the basis of the definition, the configuration model satisfying the security requirements.

Means for Solving the Problems

The present invention may be implemented as a software development apparatus, a computer program for software development, or a software development method. A software development apparatus will now be described as a representative.

In an aspect of the present invention, a software development apparatus is provided for developing application software based on an object model that requires security in a web service application. The apparatus includes a display unit that displays, in a class diagram of the application software, security annotation for adding security requirements for a service, input means for inputting the security annotation, transforming means for transforming the class diagram into a configuration model based on a markup language, and configuration-file creating means for creating a configuration file based on a markup language by serializing the configuration model based on a markup language.

The security annotation may include the security requirements and a token class of a security token that is a certificate for declaring identity of a client to a server. Moreover, the security requirements preferably include at least one of integrity, confidentiality, and authentication.

Moreover, the transforming means may perform transformation into a configuration model based on a markup language for each of the security requirements.

Security annotation is data on security of a service required in a web service application, the data being added to an object in a class diagram.

Security requirements are requirements of security required in a web service application. Integrity means assuring no falsification. Confidentiality means an action for keeping a secret, for example, encryption. Authentication means assuring validity.

A security token is data for assuring security, which is possessed by a client (for example, a client who accesses a service). A claim is declaration (for example, a name, an ID, a key, a group, a privilege, and authority) made by a client. A security token is a collection of claims.

A token class is a class in an object language (for example, Java (registered trademark)) for handling a security token, which is described above.

A markup language is a language for embedding predetermined information in a document, data, or the like created with, for example, a computer. Typical markup languages include an extensible Markup Language (XML) and a HyperText Markup Language (HTML).

A configuration model is an intermediate model that mediates transformation between an object model (for example, a UML model) and a markup language because formats of an object model and a markup language are too different from each other to perform direct transformation between an object model and a markup language. For example, security annotation described in a class diagram in an object model is extracted, and required data can be stored in a memory in a tree format so that the required data can be readily transformed into a markup language. A configuration model retains the required data in a tree format.

For example, see the following document for the UML: Craig Larman, "Applying UML and Patterns: An Introduction to Object-Oriented Analysis and Design and Interactive Development (3rd Edition)", Prentice Hall PTR, Oct. 20, 2004.

In the present invention, an application developer and a security developer can have a common understanding as to required security requirements by adding security annotation of an object used in a web service application to be developed to a class diagram of the web service application. An application developer and a security developer can also have a common understanding as to security requirements by specifying a token class of a security token.

Best Mode for Carrying out the Invention

The best mode for carrying out the invention will now be described with reference to the drawings. The best mode for carrying out the invention is just an example, and the technical scope of the present invention is not limited to the best mode for carrying out the invention.

BRIEF DESCRIPTION OF THE DRAWINGS

FIG. 6 is an illustration showing comparison of configuration models.

FIG. 7 is an illustration showing the content of each configuration model after values of platform-specific parameter data are set.

DETAILED DESCRIPTION OF THE PREFERRED EMBODIMENT

Figure 1:
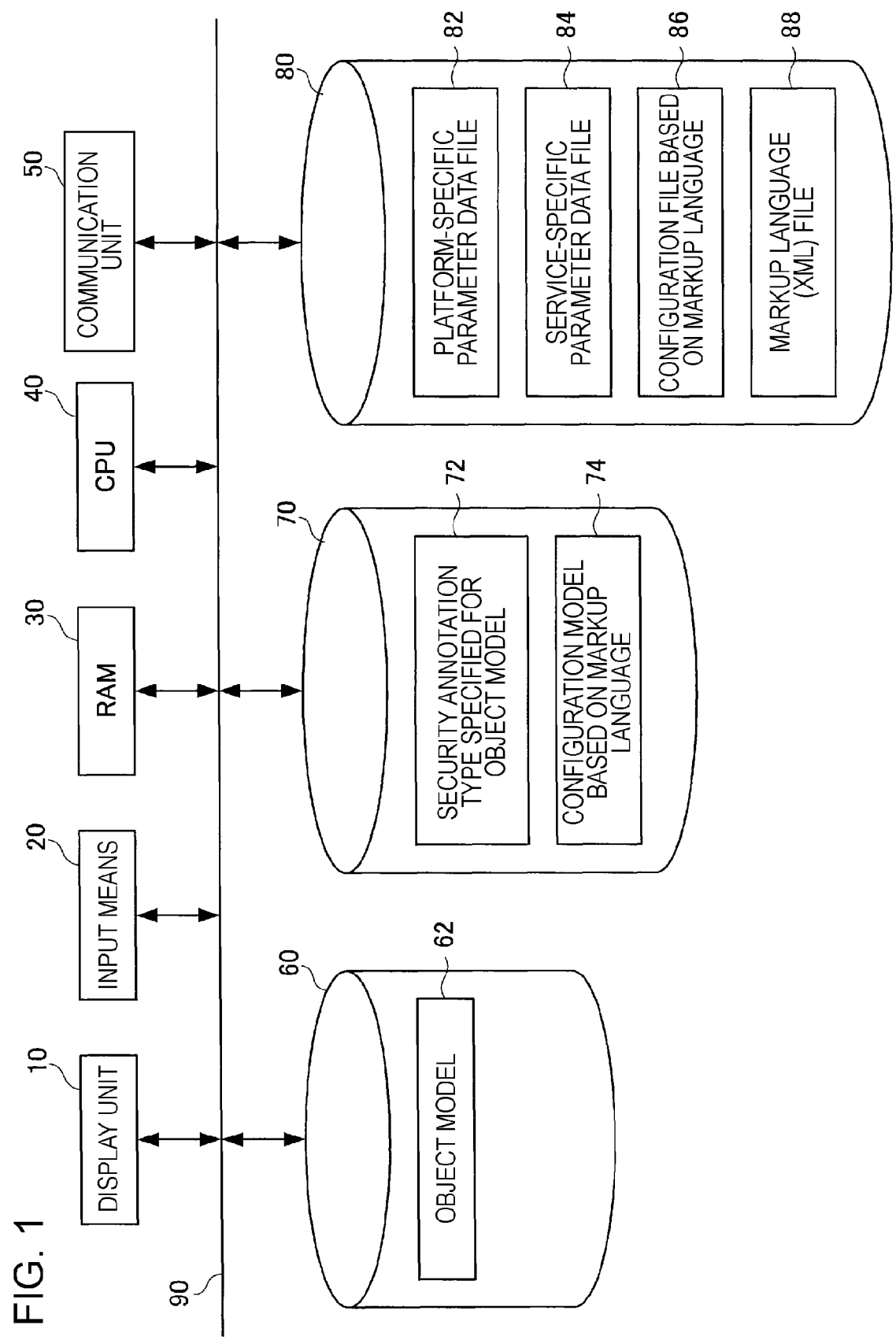
FIG. 1 is a block diagram of a software development apparatus according to the present invention.
Figure 2:
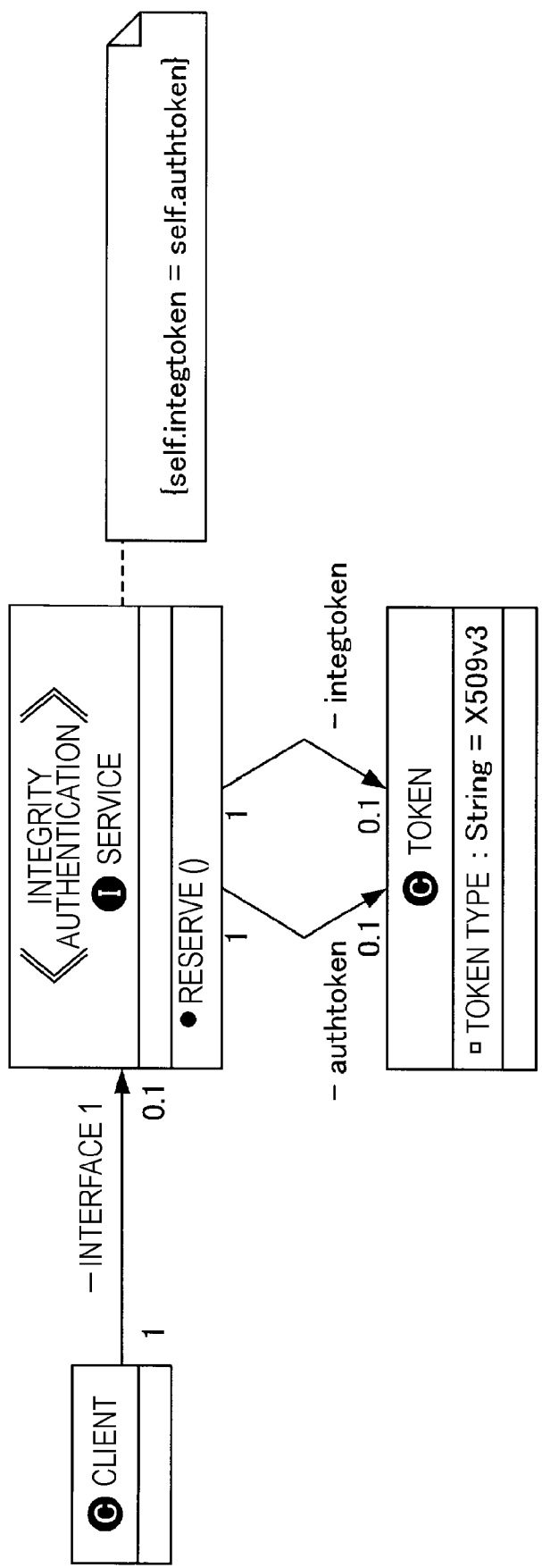
FIG. 2 shows exemplary display according to the present invention in which security annotation is added.
Figure 3:
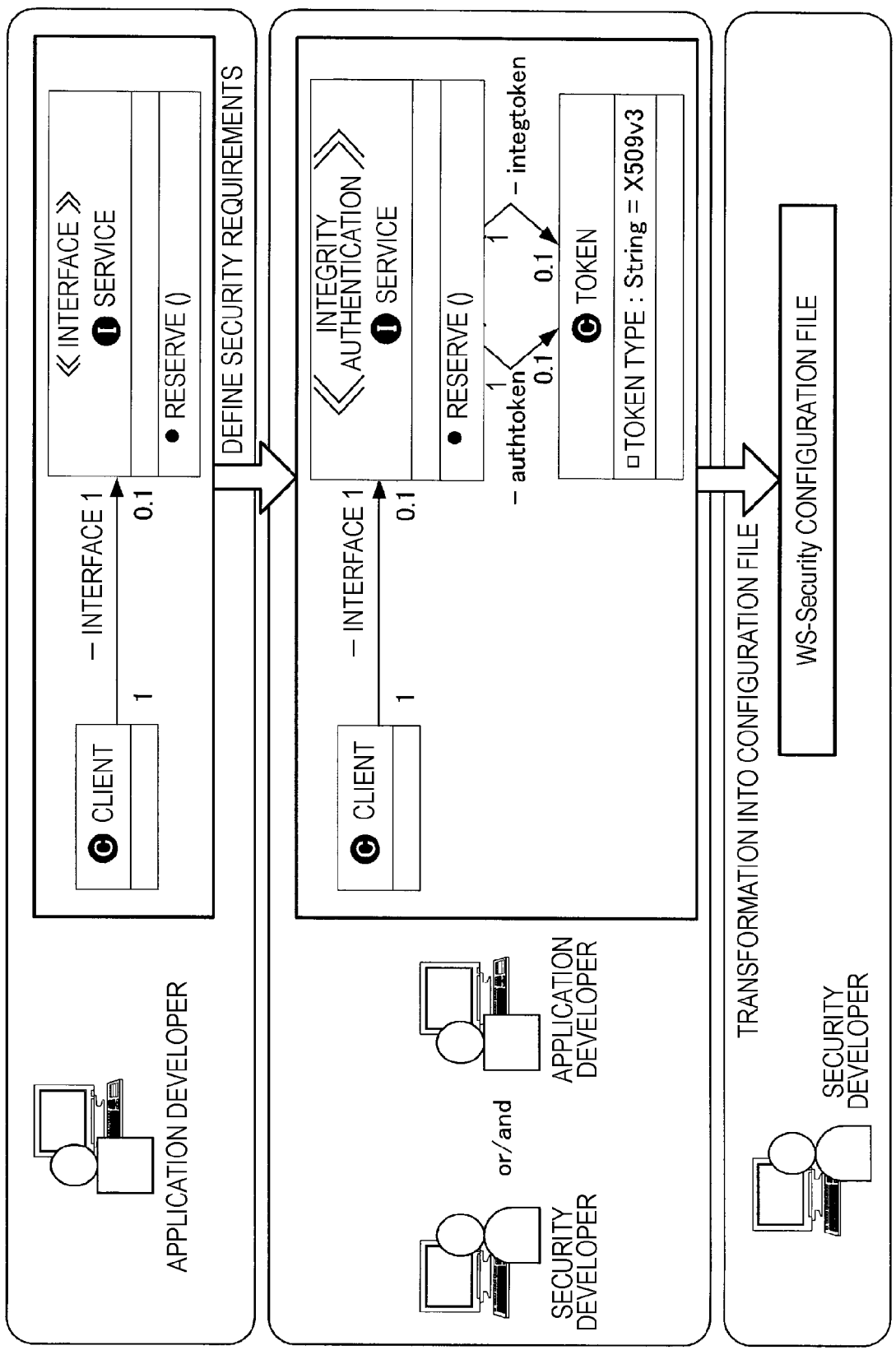
FIG. 3 shows exemplary known software development.
Figure 4:
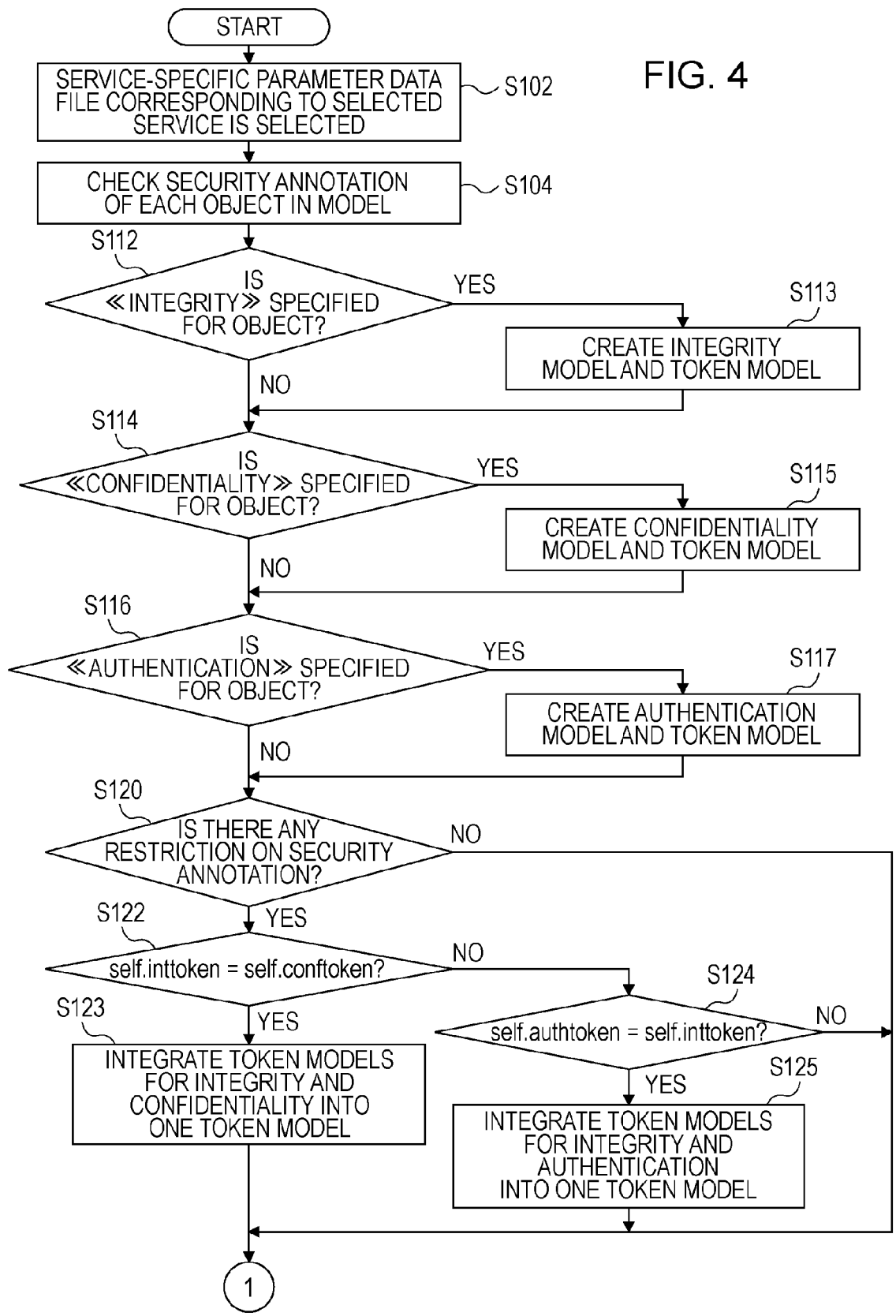
FIG. 4 is a flowchart showing the operation of the software development apparatus according to the present invention.
Figure 5:
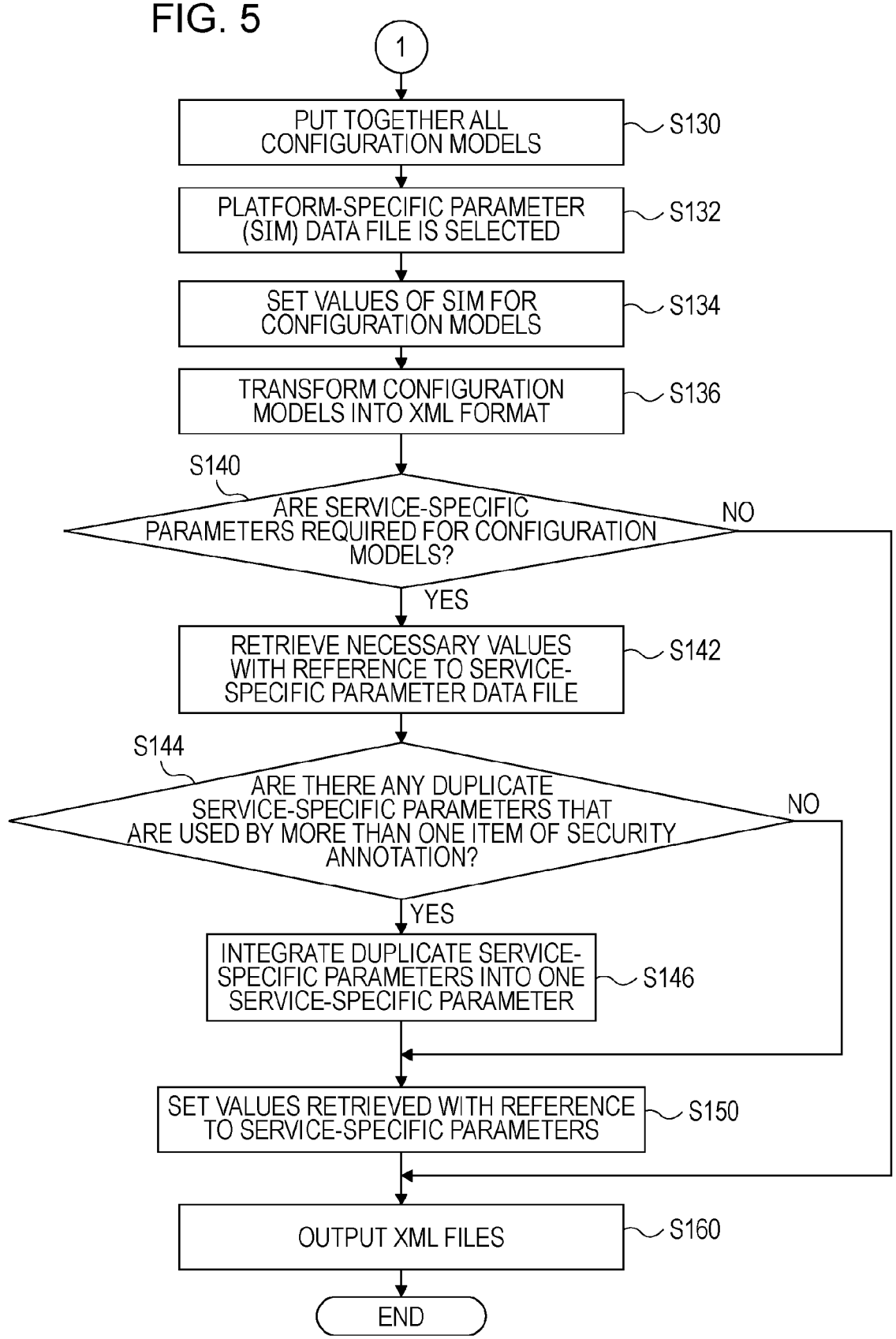
FIG. 5 is a flowchart showing the operation of the software development apparatus according to the present invention.

FIG. 1 is a block diagram showing a software development apparatus according to the present invention. FIG. 2 shows exemplary display in which security annotation is added. FIG. 3 shows exemplary known software development. FIGS. 4 and 5 are flowcharts showing the operation of the software development apparatus.

In the software development apparatus according to the present invention, a display unit 10 and input means 20 that allows input through a keyboard, a mouse, or the like and a communication unit are connected to a bus line 90, as shown in the block diagram in FIG. 1. A CPU 40 executes a software development program to, for example, display an object model and transform a class diagram in the object model into a configuration model based on a markup language. A RAM 30 temporarily stores types of security requirement specified for an object model, a configuration model based on a markup language, and image data for displaying an object model or the like. A communication unit 50 communicates with an external system and includes a transmitter/receiver unit that allows communication through a local area network or an ADSL.

A memory in the software development apparatus stores three main types of file. An object model 62 (for example, a UML model) is stored in a first file 60. A security annotation type 72 specified for an object model and a configuration model 74 based on a markup language are stored in a second file 70 using an extension of the UML. A platform-specific parameter data file 82, a service-specific parameter data file 84, a configuration file 86 based on a markup language, and a markup language file 88 are stored in a third file 80. The second file 70 and the third file 80 can be separately changed.

FIG. 2 shows exemplary display in which security annotation is added, and FIG. 3 shows exemplary known software development, as described above. Hitherto, an application developer has defined security requirements in a class diagram of application software to be developed, as shown at the top of FIG. 3. In this arrangement, the developer of application software needs to correctly understand the details of the application and simultaneously needs technical knowledge about, for example, WS-Security and WAS-WS-Security runtime. However, an application developer does not actually have sufficient technical knowledge. Thus, it is hard for the application developer to configure security settings shown at the middle of FIG. 3, and a security developer configures the security settings. Subsequently, the security settings are transformed into a configuration file. However, definition of security requirements shown at the top of FIG. 3 does not provide sufficient data for configuring security settings. Thus, misunderstanding may arise, thereby causing a problem.

This problem needs to be resolved so that the application developer and the security developer cooperate with each other. Security requirements for a service are added to a class diagram of the application software as security annotation, as in display on the display unit 10 shown in FIG. 2.

The example shown in FIG. 2 is expressed in the UML. Integrity and authentication are specified for a class called service by stereotypes of the UML, so that the developer of the application software and the security developer can have a common understanding that the security requirements of the class called service are integrity and authentication. Moreover, authentoken and integtoken are specified, which are token classes of a security token that is a certificate for declaring the identity of a client to a server. The constraints in the UML represent that these tokens are the same.

In this situation, token classes are defined because a token may be shared among different security requirements. For example, in an X.509 certificate token, a token is used in integrity and authentication. This is because, even in a model to which the same security requirement is assigned by a stereotype of the UML, a transformed configuration model based on a markup language varies with whether a token is shared. Thus, when no token class exists, distinction cannot be made in an object model (in a UML model). This is also because transformation into a configuration model based on a markup language cannot be correctly performed when a token is shared, and thus, token classes need to be installed to correctly distinguish items of security annotation.

The operation of the software development apparatus will now be described according to the flowcharts in FIGS. 4 and 5. The application developer inputs the foregoing security annotation shown in FIG. 2 through the input means 20 in advance. The input data is stored in the files 60 and 70 in the memory.

When the security developer selects a class, service, to which security annotation is added and then selects model transformation from a menu, transformation operation starts. The CPU 40 first selects a service-specific parameter data file corresponding to the selected service (S102).

Then, security annotation of each object in a development model is checked (S104). Security annotation is checked because items of the security annotation selected by the security developer are subjected to the process. As the result of the check, the CPU 40 checks whether, for example, integrity is specified for the object by a stereotype of the UML (S112). When it is determined that integrity is specified as the result of the check, the CPU 40 creates an integrity model and a token model, and the integrity model and the token model are filed in the configuration model 74 based on a markup language in the second file 70 (S113). On the other hand, when it is determined that integrity is not specified as the result of the check, the process proceeds to the next step S114.

Then, the CPU 40 checks whether, for example, confidentiality is specified for the object by a stereotype of the UML (S114). When it is determined that confidentiality is specified as the result of the check, the CPU 40 creates a confidentiality model and a token model, and the confidentiality model and the token model are filed in the configuration model 74 based on a markup language in the second file 70 (S115). On the other hand, when it is determined that confidentiality is not specified as the result of the check, the process proceeds to the next step S116.

Subsequently, the CPU 40 checks whether, for example, authentication is specified for the object by a stereotype of the UML (S116). When it is determined that authentication is specified as the result of the check, the CPU 40 creates an authentication model and a token model, and the authentication model and the token model are filed in the configuration model 74 based on a markup language in the second file 70 (S117). On the other hand, when it is determined that authentication is not specified as the result of the check, the process proceeds to the next step S120.

The reason why the process is performed in stages is that transformation between the Deployment Descriptor (DD) model and the Binding model is complicated when a token is shared among more than one security requirement. This relationship is shown in FIG. 6 where configuration models are compared with each other. The reason is that, although the process is complicated because description of a token is spread across both models, as shown in FIG. 6, only a token model needs to be processed and transformation is facilitated when transformation is performed.

In step S120, the CPU 40 checks whether any restriction applies to security annotation (S120). For example, in the example shown in FIG. 2, restriction based on a note in the UML exists, in which a token for integrity and a token for authentication are used in common. When it is determined that no restriction exists, the process proceeds to step S130. When it is determined that restriction exists as the result of the check, the CPU 40 checks whether token models for integrity and confidentiality are used in common (S122). When it is determined that token models for integrity and confidentiality are used in common, the token models for integrity and confidentiality are integrated into one token model (S123).

When it is determined that token models for integrity and confidentiality are not used in common, the CPU 40 checks whether token models for integrity and authentication are used in common (S124). When it is determined that token models for integrity and authentication are used in common, the token models for integrity and authentication are integrated into one token model (S125).

In step S130, all configuration models are put together. Then, the CPU 40 selects a platform-specific parameter (SIM) data file (S132). When the platform-specific parameter data file is selected, the CPU 40 reads the platform-specific parameter data file 82 stored in the file 80 and sets the values of the platform-specific parameter data for the configuration models (S134). Then, the configuration models are transformed into the XML format (S136).

The content of individual configuration models after the values of the platform-specific parameter data are set is shown in FIG. 7. The individual models have security annotation and data of platform-specific parameters (SIM). In FIG. 7, security annotation is expressed in italics and surrounded by dotted lines, and data that is not surrounded by dotted lines is data of platform-specific parameters (SIM).

The CPU 40 determines whether service-specific parameters are required for the configuration models, which have been transformed into the XML format (S140). When it is determined that service-specific parameters are required for the configuration models as the result of the determination, necessary values are retrieved with reference to the service-specific parameter data file 84 (S142). When it is determined that service-specific parameters are not required for the configuration models, the process proceeds to step S160.

After necessary values are retrieved, the CPU 40 checks whether any duplicate service-specific parameters that are used by more than one item of security annotation exists (S144). When it is determined that duplicate service-specific parameters are used by more than one item of security annotation as the result of the check, the duplicate service-specific parameters are integrated into one service-specific parameter (S146). Then, the values retrieved with reference to the service-specific parameters are set (S150). Then, XML files based on a markup language are output (S160). That is to say, XML files are created by serializing the configuration models transformed into the XML format. Serialization means transforming data handled within software so that the data can be stored in a file or can be sent or received through networks. The data can be taken out through the communication unit 50 by serializing the data.

A software development apparatus, a software development program, and a software development method can be provided, in which the application developer and the security developer can have a common understanding as to security annotation and jointly develop software, as described above.

A second embodiment is different from the first embodiment in that a transformation dialog that pops up is provided in the second embodiment. In some systems that require security, service-specific data other than standard specifications (for example, locations of keys, Storepass, and key names) may need to be incorporated. In such a case, the second embodiment is effective.

Figure 8:
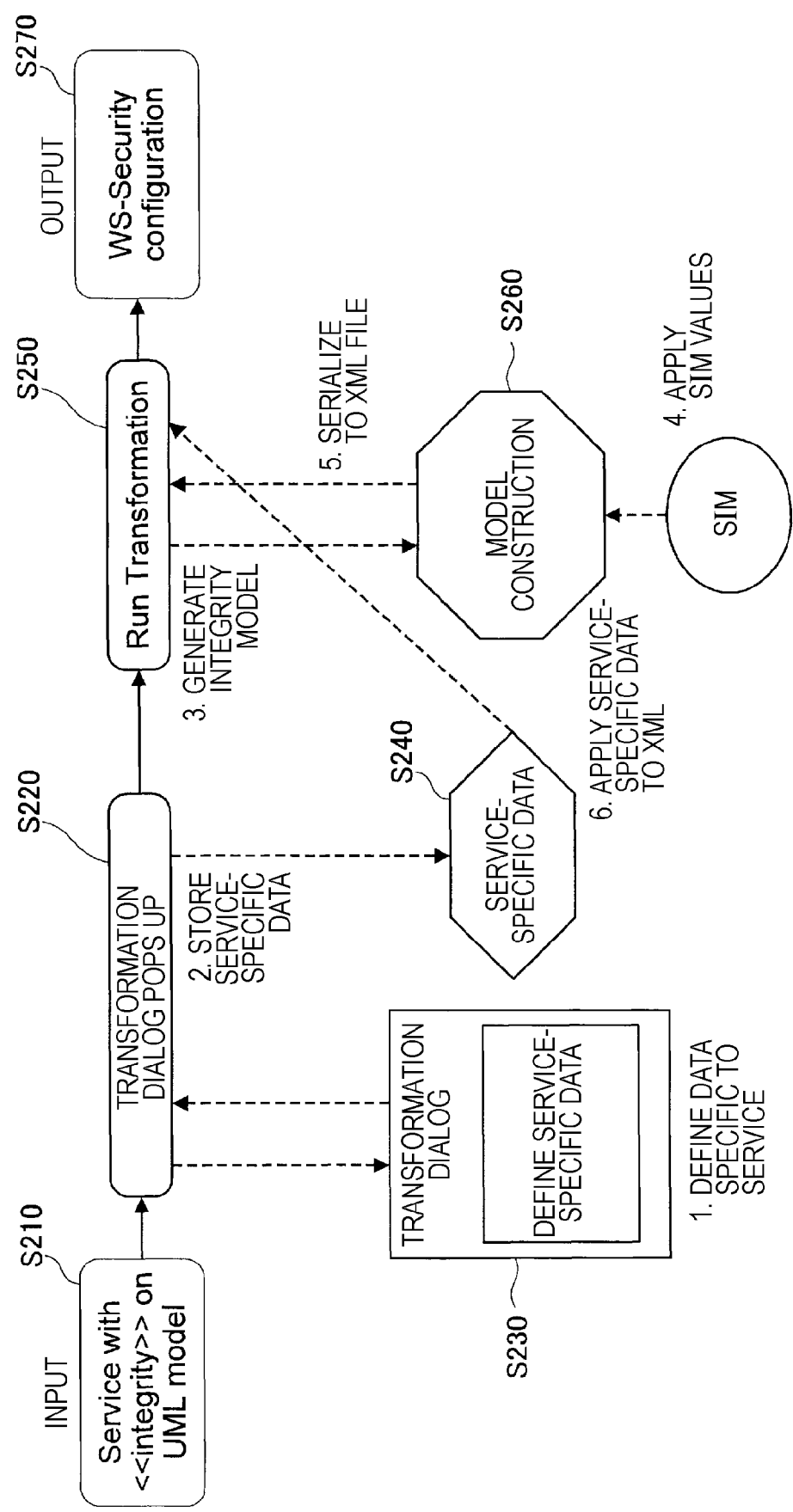
FIG. 8 is an outline block diagram of a second embodiment of the present invention.

An outline block diagram of the second embodiment of the present invention is shown in FIG. 8. Security annotation shown in FIG. 2 is first input through the input means 20 (S210). After the security annotation is input, a transformation dialog pops up (S220). A screen shown in S230 is displayed on the display unit 10 as the transformation dialog.

At this point, service-specific data is defined. For example, the sequence of processing of signature and encryption, STR-REF and KEYID of Token Reference Type, service key data (for example, locations of keys, Storepass, and key names), and client key data (for example, locations of keys, Storepass, and key names) are defined. Especially, the sequence of processing of signature and encryption is important. This is because a data recipient cannot decode data when the sequence is different.

These items of data unique to a service are input through the input means 20 and stored in the file 70 as service-specific data (S240). After the data is stored, transformation is run (S250). Transformation is run using the stored service-specific data. The subsequent process is similar to that in the first embodiment.

While the present invention has been described using the embodiments, as described above, the technical scope of the present invention is not limited to the scope described in the foregoing embodiments. Various changes or improvements may be made in the foregoing embodiments. It is apparent from the description in the claims that the embodiments that are changed or improved may be included in the technical scope of the present invention.

The software development apparatus, which has been described as an embodiment in the present invention, may be realized by a system, a method, or a program that causes a computer to execute the functions of the apparatus on a computer. Moreover, examples of the foregoing memory include a semiconductor or solid-state storage unit, and a magnetic tape. Exemplary detachable computer-readable media include a semiconductor or solid-state storage unit, a magnetic tape, a detachable computer diskette, a random access memory (RAM), a read only memory (ROM), a rigid magnetic disk, and an optical disk. Examples of the current optical disk include a compact disk-read only memory (CD-ROM), a compact disk-read/write (CD-R/W), and a DVD.

The invention claimed is:

1. A software development apparatus for developing application software based on an object model that requires security in a web service application, the apparatus comprising:
    a display unit that displays, in a class diagram of said application software, a security annotation for adding security requirements for a service;
    input means for inputting an input with said security annotation;
    transforming means for transforming said class diagram into a configuration model based on a markup language, said class diagram being described in a UML, and said security requirements being described using an extension of the UML; and
    configuration-file creating means for creating a configuration file based on said markup language by serializing said configuration model based on said markup language.

2. The software development apparatus according to claim 1, said security annotation specifying said security requirements and a token class of a security token that is a certificate for declaring identity of a client to a server.

3. The software development apparatus according to claim 2, said security requirements comprising at least one of integrity, confidentiality, and authentication.

4. The software development apparatus according to claim 2, said transforming being performed for each of said security requirements.

5. The software development apparatus according to claim 1, said markup language being XML.

6. A computer program product comprising a non-transitory computer-readable medium storing a program that is executable by a computer to perform a method of developing application software based on an object model that requires security in a web service application, said method comprising:
    displaying, in a class diagram of the application software, a security annotation for adding security requirements for a service;
    receiving said security annotation;
    transforming said class diagram into a configuration model based on a markup language, said class diagram being described in a UML, and said security requirements being described using an extension of the UML; and
    creating a configuration file based on said markup language by serializing said configuration model based on said markup language.

7. The computer program product according to claim 6, said security annotation comprising said security requirements and a token class of a security token that is a certificate for declaring identity of a client to a server.

8. The computer program product according to claim 7, said security requirements comprising at least one of integrity, confidentiality, and authentication.

9. The computer program product according to claim 6, said transforming being performed for each of said security requirements.

10. The computer program product according to claim 6, said markup language being XML.

11. A software development method for developing application software based on an object model that requires security in a web service application, said method comprising:
    displaying, in a class diagram of said application software on a display unit of a computer, security annotation for adding security requirements for a service;
    receiving, through an input of said computer, the security annotation;
    transforming, by said computer, said class diagram into a configuration model based on a markup language, said class diagram being described in a UML, and said security requirements being described using an extension of the UML; and
    creating, by said computer, a configuration file based on said markup language by serializing said configuration model based on said markup language.

12. The method according to claim 11, said security annotation comprising said security requirements and a token class of a security token that is a certificate for declaring identity of a client to a server.

13. The method according to claim 12, said security requirements comprising at least one of integrity, confidentiality, and authentication.

14. The method according to claim 11, said transforming being performed for each of said security requirements.

15. The method according to claim 11, said markup language being XML.

* * * * *